Figure 1:
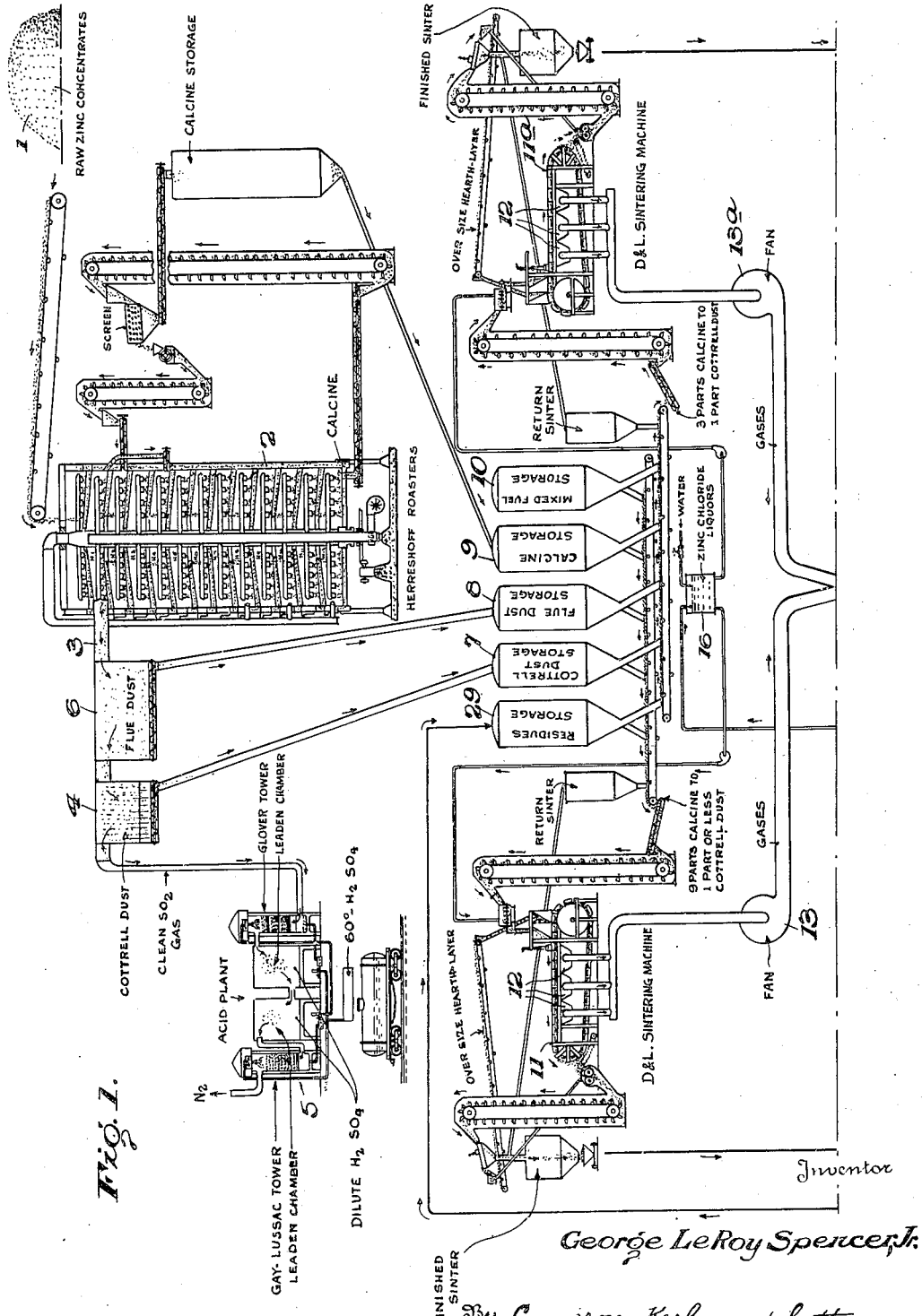

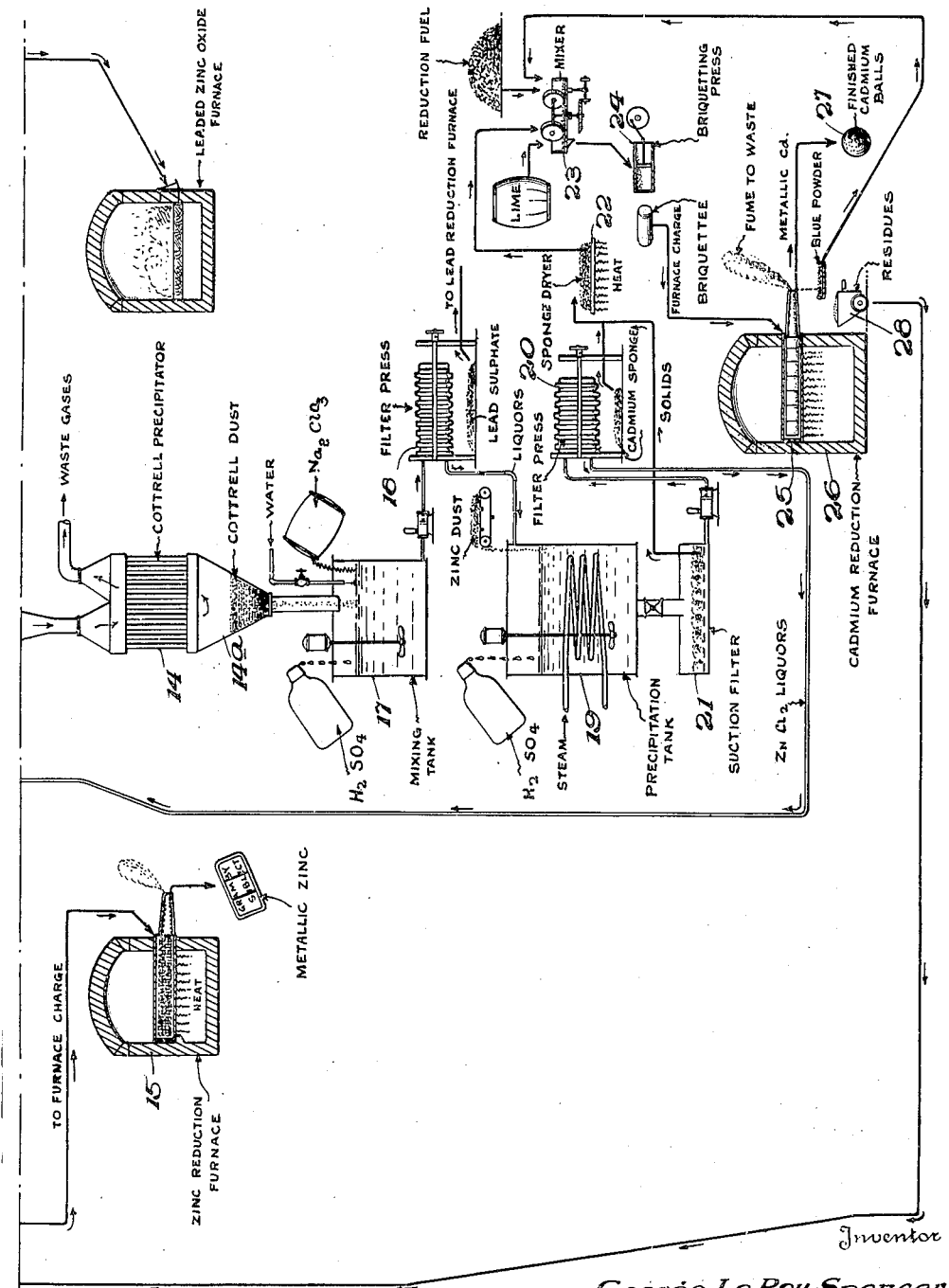

Patented Aug. 30, 1938

2,128,379

UNITED STATES PATENT OFFICE 2,128,379

RECOVERY OF VALUES FROM ZINC CONCENTRATES

George Le Roy Spencer, Jr., St. Louis, Mo., assignor to American Zinc, Lead & Smelting Company, St. Louis, Mo., a corporation of Maine Application June 1, 1937, Serial No. 145,893

10 Claims. (Cl. 75—1)

The present invention relates to the production of zinc pigments from zinc concentrates, and more particularly to the production of high-grade, intermediate, brass special or prime western slab zinc, as well as lead-free zinc pigments, and the recovery of the lead, cadmium and other impurities of concentrates, without the necessity of carefully selecting the raw concentrates to be used.

Ordinarily, raw zinc concentrates used to produce high-grade zinc slab or lead-free pigment had to be carefully selected from the standpoint of the contained lead, cadmium and other impurities. Such selected concentrates command a premium over zinc concentrates which it is possible to use in the present process for the production of these high-grade products.

One object of the present invention is to provide a process whereby high-grade zinc slab or lead-free pigment may be produced from zinc concentrates containing a large amount of lead, cadmium and other impurities, while at the same time recovering in a merchantable form a large proportion of the lead, cadmium and other impurities present in the concentrate.

The invention will be described in connection with the accompanying drawings wherein Figs. 1 and 1a together constitute a flow sheet.

In the practice of the invention undried flotation zinc concentrates 1, as received from the mines, are roasted, as in 12-hearth Herreshoff type muffler roasters 2. Preferably, natural gas is employed on the roasting hearths to maintain the proper temperatures on the lower hearths for the roasting reaction which takes place. The sulphur dioxide gas which is formed in the roasting operation is drawn off from the roasters through a flue 3 near the top and through a Cottrell electrostatic precipitator 4, which latter removes the solid particles from the gas stream by electrostatic action, and the cleaned gas passes on to an acid plant 5 to be converted into sulphuric acid.

The gases as they leave the roasters, carry with them appreciable amounts of fume or ore dust. Some of this settles and is collected in the flue at 6 between the roaster and the Cottrell precipitator, and is known as "flue dust". This flue dust amounts to approximately three to five per cent by weight of the dry weight of the concentrates fed into the roasters. The Cottrell precipitator removes from the gas entering it solids in the form of a fine, fluffy dust, technically known as "Cottrell dust", amounting to from three to five per cent of the dry weight of the concentrates charged into the roasters.

Owing to the temperature prevailing on the upper hearths of these Herreshoff roasters, a considerable amount of cadmium and lead from the concentrates being roasted is volatilized, with the result that the collected Cottrell dust contains approximately sixty-five per cent of the lead in the original concentrate and from fifteen to twenty-five per cent of the cadmium contained in such concentrates. Thus, in operation, the Herreshoff roasters eliminate, in the form of $SO_2$ gas, ninety per cent of the sulphur contained in the original concentrate, and deliver as roasted ore, three products, to wit, calcine, flue dust and Cottrell dust, which will be found to be distributed approximately as follows:

For every 100 tons dry concentrate entering the roasters—

3 to 5 tons Cottrell dust, carrying 65% of the lead and 20% of the cadmium in the concentrate, 3 to 5 tons flue dust, and 75 to 79 tons calcines.

The flue dust is in reality a calcine, which aids the sintering process, so that in reality there are two products from the roasters, to wit, Cottrell dust and calcines, the calcines being of a quality to produce high-grade or lead-free zinc pigment.

In practice, the Cottrell dust, flue dust and calcines, as well as mineral fuel, are separately stored in reservoirs 7, 8, 9 and 10, suitably positioned for feeding their contents to sintering machines 11—11a, the rate of flow of such contents being subject to accurate control from each reservoir. Preferably these reservoirs are arranged to supply Cottrell dust, flue dust, calcines and mineral fuel to a plurality of sintering machines, which machines are preferably of the Dwight & Lloyd sintering type, and are provided with hoods 12 for the reception of the gases due to the sintering operation, and these hoods are connected to suction fans 13, 13a which deliver the gases through a suitable conduit to a Cottrell precipitator 14 which will be hereinafter described.

Having obtained this concentration of a large part of the lead and cadmium of the original concentrate in a comparatively small tonnage of the Cottrell dust, it is possible, by discarding in whole or in part this Cottrell dust in the sintering operation, to secure a very much reduced lead content in the sinter, and a considerable reduction in the cadmium content of the sinter. Furthermore, by using a large amount of Cottrell dust with the calcine for sintering, a high lead content may be had in the finished sinter. Thus let it be assumed that it is desired to produce a finished sinter of a quality suitable for the production in a zinc reduction furnace 15 of metallic zinc having the specifications of brass special slab zinc. In this case the feed from the reservoirs would be so regulated as to deliver the proper proportions of calcine, Cottrell dust (if any) and flue dust to the sintering machine 11, to produce a sinter having a cadmium content ranging from .05% to .08% and a lead content ranging from .02% to .20%. The limitations on lead for high-grade sinter are readily arrived at by the entire elimination of Cottrell dust and flue dust. For intermediate, brass special and prime Western sinter, flue dust is used for only that proportion of Cottrell dust that can be used without raising the lead content of the sinter above the permissible amount. This proportion is dependent almost entirely on the lead content of the Cottrell dust, which in turn is dependent on the lead in the original raw concentrate fed to the roaster.

Cadmium limitations are obtained by the use of zinc chloride liquors, which is the form in which the zinc is recovered from the sinter gases conveyed to the Cottrell precipitator 14 in a subsequent step of the process to be hereinafter described. At the initiation of the operation, however, zinc chloride liquor is provided in a suitable tank 16 from which it is supplied to the sintering machines during the sintering operation. At the start of the process this original supply may be in the form of any suitable chloride, such as zinc chloride, sodium chloride, magnesium chloride, or calcium chloride. After the circulating requirements of zinc chloride have been built up during the operation of the process, it is not necessary to add any additional amounts of zinc chloride to the system except for small amounts lost in handling during the operation of the process. These small additions may be made by adding the necessary amounts of zinc chloride or any suitable chlorides, such as sodium chloride, magnesium chloride or calcium chloride obtained from an outside source. The actual loss of chlorides due to handling are relatively small, and in part are compensated for by the sodium chloride formed as a decomposition product from sodium chlorate used subsequently in the process to be hereinafter explained. When sintering to produce high lead sinter, calcines, with or without flue dust, are sintered with varying amounts of Cottrell dust, say in the proportions of one part of Cottrell dust to four parts of calcine.

During the sintering operations for the production of either high-grade, intermediate, brass special or prime Western sinter, as well as high lead sinter, the fume volatilized from the sintering machine carries considerable amounts of zinc, lead, cadmium and chlorine values, which values are recovered by the present process. For this purpose the said fume is collected in the Cottrell precipitator 14 placed on the pressure side of fans 13, 13a which provide suction from the sintering machines. The collected fume contains zinc, lead, cadmium and chlorine approximately in the following ranges:

| | Per cent |
|---|---|
| Zinc | 15 to 25 |
| Lead | 4 to 25 |
| Cadmium | 10 to 25 |
| Chlorine | 20 to 35 |

These ranges of metal and chlorine content vary according to the type of sintering operation, but an average fume dust produced from day to day contains approximately 24% zinc, 10% lead, 17% cadmium, 28% chlorine and 12% moisture. This dust is collected in hoppers 14a beneath the Cottrell precipitator 14, and thereafter withdrawn to separate and recover the zinc, lead, cadmium and chlorine.

The first step in this recovery is to separate the lead content of this Cottrell precipitator dust from the zinc, cadmium and chlorine values. With this end in view, the dust is mixed with water, sulphuric acid and sodium chlorate in a brick lined lead tank 17 equipped with means for agitating the pulp mechanically, whereby all the values in the dust with the exception of the lead are put into solution and the lead is then precipitated from the solution as an insoluble lead sulphate. The water acts to dissolve all water soluble constituents of the dust, and the sulphuric acid dissolves, as sulphates, all water insoluble zinc and cadmium values and reacts with the lead components of the dust to form lead sulphate which is insoluble in the solution. A sufficient amount of an oxidizing agent, such as sodium chlorate, is added for the purpose of oxidizing the sulphur dioxide and other reducing agents in the solution to prevent the occurrence of certain harmful reactions in a subsequent step.

After agitation varying from 1 to 3 hours, the insoluble lead sulphate is separated from the solution containing zinc, cadmium and chlorine values by filtration on a plate and frame press 18, and the insoluble residue washed with plant water to remove therefrom all of the soluble zinc and cadmium sulphates and chlorides that can be removed economically, after which it is available for further treatment for recovery of the lead. The lead residue is of such high grade that it compares well with commercial grades of lead ore in that it contains from 50% to 60% lead as lead sulphate, and offers no difficulty when used in place of other standard types of lead ores for either the production of lead metal or lead pigments.

The solution obtained from this step, free of all but a trace of lead, is transferred to another brick lined lead tank 19 equipped with a steam coil therein for heating the solution and also means for mechanically agitating the contents of the tank. At this point the solution in the tank is acidified with enough 60° sulphuric acid to render the solution approximately 10% acid, after which the temperature of the solution is raised to approximately 80° C., and maintained at this point while being agitated vigorously, whereupon finely divided commercial zinc dust, containing approximately 95% zinc, 0.20% lead and 0.20% cadmium, is slowly added. This results in the separation of the zinc and cadmium values of the solution by precipitating the cadmium while the zinc remains in solution, since the finely divided zinc dust reacts with the soluble cadmium salts to form a finely divided cadmium metal (commonly called cadmium sponge) and the corresponding soluble zinc salt. The precipitated cadmium sponge is then separated from the solution by filtration in filter press 20, via suction filter 21. It is possible to add sufficient zinc dust to precipitate 100% of the total cadmium, thus leaving in solution only the original zinc salts plus the additional zinc salts formed from the added zinc dust. However, while it is possible to thus completely precipitate all of the cadmium in solution, it is more economical to precipitate from 90% to 95% of the total cadmium, thus avoiding the use of any great excess of zinc dust over that theoretically required to precipitate 100% of the cadmium. The 5% to 10% of the original cadmium which is not precipitated is not lost however, since the zinc liquor produced at this step is returned to the tank 16 for use in the sintering machines, as herein described, and the cadmium content thereof will be volatilized from the sintering machine bed and recovered in the Cottrell precipitator dust for subsequent treatment.

It is during the cadmium precipitating operation in tank 19 that the harmful side reactions, referred to above, would occur if the solutions were not oxidized. These consist primarily of the reactions between soluble cadmium chloride, sulphurous acid and the commercial zinc dust added, which would form a mixture of cadmium sulphide and sulphur. These two components are insoluble and would precipitate out of the solution. It is necessary to prevent this particular reaction because the resulting cadmium sulphide would not be suitable for the production of metallic cadmium by the present process.

After the cadmium sponge has been precipitated, as above described, the contents of the tank are filtered on the suction box filter 21 in series with the small plate and frame filter press 20, and the solids washed. These solids consist of cadmium sponge containing approximately 35% moisture, 75% cadmium, and .5% lead (on the dry basis), and are ready for the final cadmium reduction step. For this purpose the sponge is dried on an ordinary flat cast iron hearth drier 22 to approximately 10% moisture and then mixed with approximately 10% reduction fuel, preferably in the form of either petroleum coke, by-product coke breeze, or anthracite coal, and from 4% to 10% of a reagent that will react with the chloride present to form chlorides that are volatile only at a much higher temperature. Such reagents as the oxides of the alkaline earth metals, namely, calcium oxide, barium oxide, magnesium oxide or strontium oxide may be used. The mixture is then treated in a grinding chaser-mill 23 until complete mixing and grinding of the sponge, reduction fuel and the alkaline earth metal oxide is effected. This ground mixture is then briquetted by any suitable means, as on a screw-jack type press 24 in the form of briquettes preferably 7" in diameter and from 3" to 6" long. After these briquettes are dried for 24 hours, they are charged into metal retorts 25 for distillation. After the briquettes are charged in the retorts, an ordinary conical clay condenser, approximately 18" long, is inserted in the usual manner in the retort mouth, and the joint between the retort and the condenser is sealed as usual either with clay or a mixture of clay and fine anthracite coal. When all the retorts have been charged, the temperature of the furnace 26 is gradually raised to a maximum of 910° C., which is above the distillation temperature of cadmium vapor and the reduction temperature of cadmium oxide.

The alkaline earth metal oxide, as the hydrated lime, added in the mixing operation of the reduction fuel and cadmium sponge is an improvement on the methods heretofore employed of distilling cadmium sponge. This lime, which is hydrated calcium oxide, reacts with small amounts of chlorine left in the sponge to form calcium chloride and thereby prevents the reaction of small amounts of lead contained in the sponge with the chlorine content which otherwise would form lead chloride, which has the property of distilling in the same temperature range as cadmium vapor. If lead chloride were permitted to form, lead chloride vapor would react with the cadmium vapor to form cadmium chloride and lead vapor or lead metal (depending upon the temperature of the system) and in either event would contaminate the cadmium metal with lead in the condenser. The addition of the lime prevents the occurrence of these undesired reactions, and the lead content of the cadmium metal produced is well below .05%, which is the maximum allowed by the consumers of cadmium metal. Since the addition of lime in this manner prevents prohibitive contamination of the cadmium metal with lead, it is possible to operate the distilling furnace at a temperature as high as 910° C. The cadmium sponge distilled by methods heretofore practiced contains small amounts of lead, and the temperature of the distilling operation has to be kept well below 910° C., in order to prevent a prohibitive amount of lead metal from distilling over with the cadmium metal. By the present invention the increase in the furnace operating temperature results in faster rates of distilling and a more economical operation, since the capacity of any unit is thereby increased. Furthermore, operating the furnace at a maximum temperature of 910° C. results in an increased recovery of cadmium in the form of metallic cadmium from the retort charge, this increase being from 5% to 20% over the recoveries heretofore obtained in the known methods of distilling cadmium.

The cadmium content of the briquettes is primarily in the form of fine cadmium sponge metal, and reduction fuel is used for the purpose of reducing any cadmium oxide to cadmium metal and also to prevent the oxidation of the fine cadmium sponge metal by residual retort gases, so that cadmium vapor will be distilled from the charge and subsequently condensed in the refractory condenser. The cadmium metal, in a molten state, is drawn at regular intervals from the condensers and is cast into marketable shapes.

The greater portion of the cadmium is distilled from the retort and condensed as molten cadmium metal, but approximately one-fifth of the total collects in the condenser as a fine metallic cadmium powder, which will not coalesce along with cadmium metal. This product is termed "blue powder", and this is recharged into the retorts in the next distillation operation in order to obtain from the "blue powder" the cadmium value as a merchantable cadmium metal. For this purpose, the "blue powder" is returned to the mixing mill 23 to be mixed with cadmium sponge for distillation.

After the distillation cycle, which requires from 15 to 20 hours, better than 90% of the original cadmium has been distilled from the retort charge, there being left approximately 2% to 3% of the original cadmium in the charge in the retort residues 28. These residues will contain cadmium, zinc, and lead in approximately the following ranges:

Cadmium _____ 1.5% to 6.0%
Zinc _____ 7.0% to 30.0%
Lead _____ 1.5% to 8.0%

The cadmium, zinc and lead values of these residues are subsequently recovered by conveying the residues to tanks 29 from which they are mixed with the feed to the sintering machines where the cadmium and lead content is volatilized along with a portion of the cadmium content of the ore fed to these machines.

The liquor separated from the cadmium sponge in the last filtering operation above described contains primarily zinc chloride with small amounts of cadmium chloride and some zinc and cadmium sulphates. For the purpose of recovering the values in this solution, the solution is conveyed to the zinc chloride tank 16, above referred to, for moistening the feed to the sintering machine during subsequent sintering operations, and the zinc chloride acts as a chloridizing agent for the removal of a portion of the cadmium and lead from the sinter. The solution thus used for moistening the feed to the sintering machines replaces an equivalent amount of plant water which would otherwise be used for this purpose. The use of this zinc liquor for moistening the feed to the sintering machine results in the volatilization and recovery of the cadmium contained in the solution while the zinc contained in the solution is left in the sinter produced, thus rendering possible the recovery of this zinc in other operations. If desired, however, this zinc liquor can be used for the production of commercial zinc chloride having a marketable value.

As an example of this step of recovering values from the Cottrell dust, 7,338 wet pounds of Dwight & Lloyd Cottrell dust (14a) from the sintering machines and analyzing on the wet basis.

|  | Per cent |
|---|---|
| Moisture | 22.15 |
| Cadmium | 12.70 |
| Zinc | 17.70 |
| Lead | 10.40 |
| Chlorine | 24.40 | and containing

|  | Pounds |
|---|---|
| Cadmium | 931 |
| Zinc | 1,297 |
| Lead | 766 |
| Chlorine | 1,792 | is mixed with 1,000 gallons of plant water in the brick lined leaching tank 17 and this mixture then agitated with a motor driven propeller agitator. After the dust and water is well mixed, a total of 700 pounds of 60° sulphuric acid is added while agitation is continued. To this pulp is then added 100 pounds of commercial grade sodium chlorate and agitation continued for a total period of 1½ hours. The pulp is then filtered and washed on the plate and frame press 18 and the clear filtrate delivered to the precipitating tank 19. The solids, or lead cake, weighing 2,110 pounds wet and analyzing on the wet basis—

|  | Per cent |
|---|---|
| Moisture | 33.50 |
| Cadmium | 1.10 |
| Zinc | 2.30 |
| Lead | 34.70 |
| Chlorine | 1.40 | and containing

|  | Pounds |
|---|---|
| Cadmium | 22 |
| Zinc | 49 |
| Lead | 731 |
| Chlorine | 29 | are stored for ultimate use as a lead ore.

A total of 400 pounds of 60° sulphuric acid is added to the clear filtrate (1,150 gallons) in the precipitation tank 19 which is then heated to 80° C. with steam, and a total of 900 pounds of commercial zinc dust added. After precipitation the pulp is filtered and washed there being recovered 1,620 pounds of wet cadmium sponge analyzing on the wet basis—

|  | Per cent |
|---|---|
| Moisture | 35.0 |
| Cadmium | 51.6 |
| Zinc | 3.3 |
| Lead | 0.5 | containing

|  | Pounds |
|---|---|
| Cadmium | 837 |
| Zinc | 54 |
| Lead | 8 |

The zinc liquor (1,950 gallons) obtained analyzes

|  | Pounds |
|---|---|
| Zinc | per gallon 1.070 |
| Cadmium | do .039 |
| Chlorine | do .730 | and contains

|  | Pounds |
|---|---|
| Zinc | 2,077 |
| Cadmium | 76 |
| Chlorine | 1,423 |

This liquor is pumped to the storage tank 16 for use in the sintering operation.

The cadmium sponge is dried to 12% moisture and mixed in the chaser mill 23 with 110 pounds petroleum coke and 40 pounds of hydrated lime. After mixing, it is formed into briquettes which are charged into retorts and distilled. A total of 610 pounds of cadmium metal is produced together with 245 pounds of blue powder containing 160 pounds of cadmium. The residues 28, weighing 420 pounds, analyzing—

|  | Per cent |
|---|---|
| Cadmium | 5.8 |
| Zinc | 19.5 |
| Lead | 3.9 | containing

|  | Pounds |
|---|---|
| Cadmium | 24 |
| Zinc | 82 |
| Lead | 16 | are conveyed to storage tank 29 from which they are supplied to the sintering machine feed.

It will thus be seen that without the necessity of carefully selecting the concentrates employed, high-grade, intermediate, brass special or prime Western slab zinc, as well as lead-free zinc pigments may be produced at will; that a very large proportion of the lead and cadmium values are recovered; that the distillation of the cadmium is accomplished more rapidly and more economically than in prior practice; and that the zinc chloride liquor employed is used in a continuous circuit and without material waste.

What is claimed is:

1. The process of treating zinc ore concentrates containing lead, cadmium and other impurities, which consists in calcining the concentrates, whereby lead and cadmium are removed therefrom in the calcining fumes, collecting lead and cadmium in solid form from said fumes, mixing a portion of said collected lead and cadmium with the calcine and sintering the mixture.

2. The process of recovering values from zinc ore concentrates containing lead, cadmium and other impurities, which consists in calcining the concentrates, whereby lead and cadmium are removed therefrom in the calcine fumes, collecting lead and cadmium in solid form from said fumes, sintering the calcine while adding zinc chloride, collecting in solid form lead and cadmium volatilized during the sintering, mixing the same with water sulphuric acid and an oxidizing agent under agitation, filtering the solution, adding sulphuric acid to the clear filtrate and heating to approximately 80° C., adding zinc dust, filtering and washing cadmium sponge precipitated therefrom, returning the zinc chloride liquor from the filter press for reuse in sintering operations, mixing the cadmium sponge with a reducing fuel and an alkaline earth metal oxide, distilling metallic cadmium therefrom, and returning the residues to the sintering machine.

3. The process of recovering values from zinc ore concentrates containing lead, cadmium and other impurities, which consists in calcining the concentrates, whereby lead and cadmium are volatilized therefrom, collecting volatilized lead and cadmium in solid form from the fumes, sintering the calcine while adding zinc chloride, collecting as Cottrell dust the lead and cadmium volatilized during the sintering, mixing the Cottrell dust with water, sulphuric acid and sodium chlorate under agitation, filtering and washing the pulp, adding sulphuric acid to the clear filtrate and heating to approximately 80° C., adding zinc dust, filtering and washing the precipitate as cadmium sponge, returning the zinc chloride liquor from the filter press for reuse in sintering operations, mixing the cadmium sponge with a reducing fuel and lime, distilling metallic cadmium therefrom, and returning the residues to the sintering machine.

4. The process of recovering values from zinc ore concentrates containing lead, cadmium and other impurities, which consists in calcining the concentrates, whereby lead and cadmium are volatilized therefrom, collecting volatilized lead and cadmium in solid form from the fumes, sintering the calcine while adding zinc chloride, collecting as Cottrell dust lead and cadmium volatilized during the sintering, mixing the Cottrell dust with water, sulphuric acid and an oxidizing agent under agitation, filtering and washing the pulp, adding sulphuric acid to the clear filtrate and heating to approximately 80° C., adding zinc dust, filtering and washing the precipitate as cadmium sponge, returning the zinc chloride liquor from the filter press for reuse in sintering operations, mixing the cadmium sponge with a reduction fuel and lime, distilling metallic cadmium therefrom, and returning the residues to the sintering machine.

5. The process of recovering values from zinc ore concentrates containing lead, cadmium and other impurities, which consists in calcining the concentrates, whereby lead and cadmium are volatilized therefrom, collecting volatilized lead and cadmium in solid form from the fumes, sintering the calcine while adding zinc chloride, collecting as Cottrell dust lead and cadmium volatilized during the sintering, mixing the Cottrell dust with water, sulphuric acid and sodium chlorate under agitation, filtering and washing the pulp, adding sulphuric acid to the clear filtrate and heating to approximately 80° C., adding zinc dust, filtering and washing the precipitate as cadmium sponge, returning the zinc chloride liquor from the filter press for reuse in sintering operations, mixing the cadmium sponge with a reduction fuel and an alkaline earth metal oxide, distilling metallic cadmium therefrom, and returning the residues to the sintering machine.

6. The process of recovering values from zinc ore concentrates containing lead, cadmium and other impurities, which consists in calcining the concentrates, whereby lead and cadmium are volatilized therefrom, collecting volatilized lead and cadmium in solid form from the fumes, sintering the calcine while adding zinc chloride, collecting as Cottrell dust lead and cadmium volatilized during the sintering, mixing the Cottrell dust with water, sulphuric acid and an oxidizing agent under agitation, filtering and washing the pulp, adding sulphuric acid to the clear filtrate and heating to approximately 80° C., adding zinc dust, filtering and washing the precipitate as cadmium sponge, returning the zinc chloride liquor from the filter press for reuse in sintering operations, mixing the cadmium sponge with a reduction fuel and an alkaline earth metal oxide, distilling metallic cadmium therefrom and returning the residues to the sintering machine.

7. In a process of recovering values from zinc concentrates, the step of sintering the calcined concentrates, collecting in the form of Cottrell dust zinc, lead, cadmium and chlorine values vaporized during the sintering step, adding water sulphuric acid and sodium chlorate to said dust and thoroughly mixing the same, separating the lead precipitated in the resulting solution, then adding sulphuric acid to the clear solution, heating the solution and adding zinc dust thereto and then separating cadmium sponge as a precipitate from the solution.

8. The process of securing cadmium sponge from the sinter fumes of zinc concentrates which consists in collecting said fumes in solid form, subjecting the solids to an oxidizing agent and a sulfuric acid-water solution whereby all except the lead values are dissolved, separating the undissolved lead value from the solution, and then precipitating cadmium sponge from the solution.

9. The process of securing cadmium sponge from the sinter fumes of zinc concentrates which consists in collecting said fumes in solid form, subjecting the solids to a sulfuric acid-water-sodium chlorate solution, whereby all the solids except the lead values are dissolved, separating the undissolved lead values from the solution, and then precipitating cadmium sponge from the solution.

10. The process of securing cadmium sponge from the sinter fumes of zinc concentrates which consists in collecting said fumes in solid form, subjecting the solids to a sulfuric acid-water solution containing an oxidizing agent, whereby all the solids except the lead values are dissolved, separating the undissolved lead values from the solution, and then precipitating cadmium sponge from the solution.

GEORGE LE ROY SPENCER, Jr.